Sept. 29, 1942.　　　B. E. STEVENS　　　2,297,674
VOLTAGE REGULATOR
Filed Aug. 31, 1940
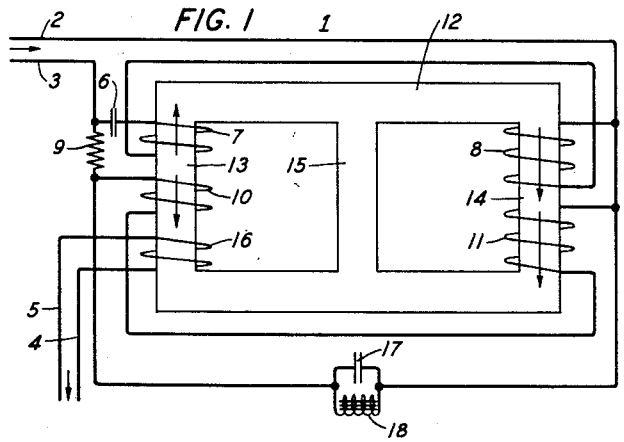
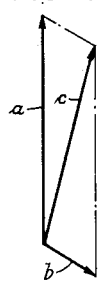
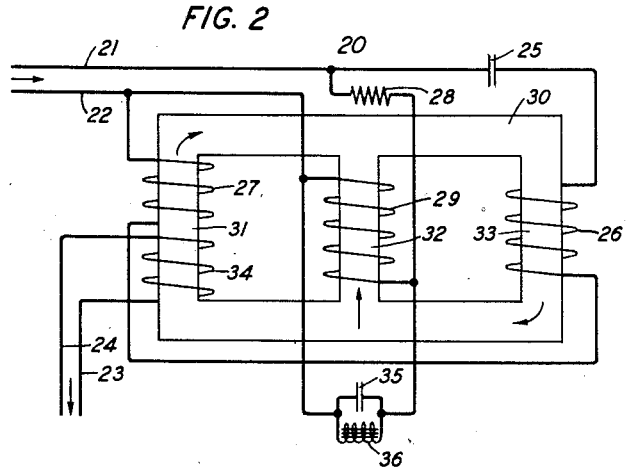
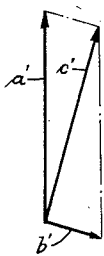
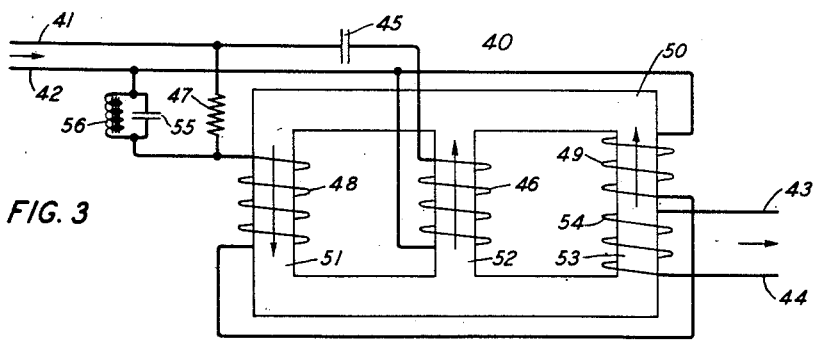
INVENTOR
B. E. STEVENS
BY
Wayne B Wells
ATTORNEY Patented Sept. 29, 1942

2,297,674

UNITED STATES PATENT OFFICE 2,297,674

VOLTAGE REGULATOR

Bruce E. Stevens, Kew Gardens, N. Y., assignor to Bell Telephone Laboratories, Incorporated, New York, N. Y., a corporation of New York Application August 31, 1940, Serial No. 355,000

12 Claims. (Cl. 171—119)

This invention relates to voltage regulators and particularly to voltage regulators employing the ferro-resonance phenomenon.

One object of the invention is to provide a voltage regulator having a ferro-resonance circuit and a compensating circuit with the inductive windings thereof mounted on a three-legged core that shall maintain constant voltage in an improved manner on a load circuit irrespective of voltage changes on an alternating current supply circuit or load changes.

A further object of the invention is to provide a voltage regulator between an alternating current supply circuit and a load circuit with a ferro-resonance circuit connected across the supply circuit and including the primary winding of a transformer having a three-legged core and a secondary winding connected to the load circuit and a compensating circuit having a compensating winding mounted on the three-legged core that shall oppose the primary flux by the compensating winding flux which is of less value but which varies at a greater rate than the primary flux for supply circuit voltage changes.

A commercial source of alternating current very often varies in voltage sufficient to interfere with the operation of apparatus connected thereto which requires constant voltage. Moreover, commercial sources of alternating current very often have frequency changes of small duration which interfere with the operation of many voltage regulators.

In a voltage regulator constructed in accordance with the invention, the voltage supplied to a load circuit is maintained constant irrespective of voltage or frequency changes on the alternating current source connected to the regulator. Furthermore, the regulator is provided with compensating means to correct for any error that may be caused by changes in temperature. The regulator is simple in construction and comprises coils mounted on the legs of a three-legged core in circuit with a condenser and a resistance element.

According to one form of the invention a voltage regulator is connected between an alternating current supply circuit and a load circuit. The voltage regulator comprises a ferro-resonance circuit and a main compensating circuit connected across the alternating current supply circuit. The ferro-resonance circuit comprises a condenser and two primary windings of a transformer. The compensating circuit comprises a resistance element and two compensating windings. The two primary windings in the ferro-resonance circuit are respectively mounted on the outside legs of a three-legged core with the flux produced by the windings in series-aiding relation. The two compensating windings are also respectively mounted on the two outside legs of the three-legged core with the flux produced by the windings in series opposing relation. The secondary winding of the transformer is mounted on the outside leg of the core wherein the flux produced by the primary winding and the compensating winding oppose each other.

The flux produced by the two primary windings will not pass through the central leg of the core if the fluxes in the three-legged core are balanced. However, during operation some unbalance of the fluxes may take place and some of the primary flux may pass through the central leg. The flux produced by the two compensating windings will pass through the central leg of the core. The ferro-resonance circuit is operated above the jumping point thereof so that the magnetic flux produced by the transformer primary windings has less variation than the supply circuit voltage variations. The three-legged core carrying the windings of the regulator is operated above the knee of the magnetization curve thereof in order to assist in effecting a regulating operation. The principal object of the compensating circuit is to set up a magnetic flux in the core of the transformer which is smaller than the flux produced by the primary windings but which opposes the primary flux in the leg having the secondary winding and changes at a rate more nearly the same as the supply circuit voltage variations. The second primary winding and the second compensating winding, which have flux in the same direction, serve to provide sufficient inductive reactance in the ferro-resonance circuit. The two compensating windings are mounted to produce flux in series opposition in order to minimize voltage transfer between these windings and the primary windings.

The transformer core has a non-linear magnetization characteristic so that the primary flux acting on the secondary winding has a much less variation than the voltage variations of the alternating current source. In the ferro-resonance circuit the capacity reactance of the condenser is greater at all times than the inductive reactance of the two primary windings in the transformer. The total impedance of the ferro-resonance circuit is essentially the difference between the condenser reactance and the reactance of the transformer primary windings. Accordingly, if the supply circuit voltage is increased the inductive reactance decreases and the total impedance of the ferro-resonance circuit increases so that the current flow through the ferro-resonance circuit does not increase at as great a rate as that of the supply circuit voltage. This relatively small increase of current flow through transformer primary windings together with the decreasing impedance of the transformer results in a much smaller per cent increase of transformer voltage as compared with the increase in voltage of the supply circuit. In like manner, when the supply circuit voltage decreases there is a much smaller percentage decrease of transformer voltage as compared with the supply circuit voltage decrease.

The main compensating circuit products a flux in the three-legged core which opposes the primary flux in the leg with the secondary winding but which is less and changes at a considerably greater rate. This opposition flux in the core of the transformer serves to insure that the output voltage supplied by the secondary winding is substantially constant irrespective of the changes in the supply circuit voltage. The resistance element in the compensating circuit is provided to adjust the compensating circuit according to the compensating values required and to provide means to connect a temperature frequency compensating circuit to the regulator.

A second condenser shunted by a retardation coil is connected across the windings in the compensating circuit to effect compensation for frequency changes and temperature changes. The circuit comprising the second condenser in parallel with the retardation coil is tuned to the normal frequency of the supply circuit. If the frequency of the source goes above normal value, the temperature frequency compensating circuit is untuned so that the current through it becomes leading and offsets the lagging current drawn through the resistance. This action assists the compensating circuit in opposing the flux of the primary winding in the core of the transformer. If the frequency of the source falls below normal value, the frequency and temperature compensating circuit becomes untuned so that the current through it becomes lagging and adds to the lagging current drawn through the resistance. This operation opposes the action of the compensating circuit in opposing the flux of the transformer primary winding.

Temperature changes in the voltage regulator affect the quality of the regulating operation. A temperature increase tends to reduce the capacities of the two condensers in the regulator whereas a temperature decrease tends to increase the capacities of the two condensers. In some types of condensers the capacity may increase with increase in temperature. The change in the capacity of the condenser in the temperature frequency circuit always acts to oppose the action of the change in capacity of the condenser in the ferro-resonance circuit, which is caused by temperature change. When there is a temperature change the impedances of the two condensers are chiefly affected.

If the temperature rises the capacities of the two condensers are reduced. The reduction of the capacity of the condenser in the temperature frequency compensating circuit tends to draw a lagging current which aids the lagging current drawn through the resistance and opposes the effect of the main compensating circuit in opposing the primary flux in the transformer to maintain the resultant magnetic flux substantially constant. If the temperature decreases the capacities of the two condensers increase. The increase in the capacity of the condenser in the temperature frequency compensating circuit causes a leading current to be drawn. The leading current assists the compensating circuit in producing a flux to oppose the flux of the primary windings to maintain the resultant magnetic flux in the transformer substantially constant.

In the accompanying drawing:

Fig. 1 is a diagrammatic view of a voltage regulator constructed in accordance with the invention;

Figs. 2 and 3 are diagrammatic views of modifications of the voltage regulator shown in Fig. 1; and Figs. 4 and 5 are vector diagrams illustrating the flux changes effected to maintain constant load voltage irrespective of load changes.

Referring to Fig. 1 of the drawing, a voltage regulator 1 is shown connected between an alternating current supply circuit comprising conductors 2 and 3 and a load circuit comprising conductors 4 and 5. A ferro-resonance circuit comprising a condenser 6 and two primary windings 7 and 8 is connected across the supply circuit. A main compensating circuit comprising a resistance element 9 and two windings 10 and 11 is connected across the supply circuit. The primary windings 7 and 8 and the compensating windings 10 and 11 are mounted on a three-legged core 12. The core 12 is provided with two outer legs 13 and 14 and a central leg 15.

The primary winding 8 and the compensating winding 11 are mounted on the leg 14 of the core 12, and the primary winding 7 and the compensating winding 10 are mounted on the leg 13 of the core 12. A secondary winding 16 is also mounted on the leg 13. The secondary winding 16 is connected to the output conductors 4 and 5. The primary windings 7 and 8 are mounted on the core 12 to produce flux in series-aiding relation whereas the compensating windings 10 and 11 are mounted on the core 12 to produce flux in series opposing relation. If the fluxes in the core 12 were balanced no flux from the primary windings 7 and 8 would flow through the central leg 15. However, if there is an unbalance in the fluxes in the core some primary flux will flow through the central leg 15. The flux produced by the compensating windings 10 and 11 will flow through the central leg 15.

The ferro-resonance circuit is operated above the jumping point so that reduced voltage changes are effected across the secondary winding for any voltage changes on the source. The core 12 is operated above the knee of the magnetization curve thereof. The capacity reactance of the condenser 6 is greater at all times than the combined inductive reactance of the two primary windings 7 and 8. The total impedance of the ferro-resonance circuit is essentially the difference between the reactance of the condenser 6 and the reactances of the primary windings 7 and 8. The inductances of the two primary windings 7 and 8 decrease with increase in the supply circuit voltage so that if the supply circuit voltage is increased the total impedance in the ferro-resonance circuit increases and the current flow therethrough does not increase at as great a rate as that of the supply circuit voltage increase. This relatively small increase of current flow through the transformer, together with the decreased impedance of the transformer results in a much smaller percentage of increase in the transformer voltage as compared with the increase of voltage of the supply circuit voltage. An opposite effect takes place in case the supply circuit voltage falls below normal value. In other words, the transformer voltage changes when controlled solely by the ferro-resonance circuit are much less than the supply circuit voltage changes.

The main compensating circuit comprising the resistance 9 and the two windings 10 and 11 is provided for varying the reactance of the primary windings 7 and 8 in a manner to maintain the voltage across the secondary winding 16 constant irrespective of the supply circuit voltage variations. The flux produced by the main compensating circuit in the core 12 opposes in the leg 13 the flux produced by the primary windings 7 and 8. However, the flux produced by the compensating windings is less than the flux produced by the primary windings but varies at a greater rate for any change in voltage on the supply circuit. The compensating circuit so changes the transformer output voltage as to maintain this voltage constant irrespective of supply circuit voltage variations. The primary winding 8 and the compensating winding 11 produce flux in the same direction in order to provide sufficient inductive reactance in the ferro-resonance circuit. The two compensating windings 10 and 11 produce flux in series opposing relation in order to insure against any transfer of voltage between the primary windings and the compensating windings.

A temperature frequency compensating circuit comprising a condenser 17 in parallel with a retardation coil 18, is connected across the compensating windings 10 and 11. The temperature frequency compensating circuit is tuned to the normal frequency of the alternating current source and serves to compensate the regulator for any changes in frequency of the source of any temperature changes. If the frequency of the current supplied by the source tends to increase the voltage output from the regulator tends to increase and the temperature frequency compensating circuit is untuned so that the current flow through it becomes leading. This leading current drawn by the temperature frequency compensating circuit offsets the lagging current drawn through the resistance 9 by the main compensating circuit. This operation assists the main compensating circuit to produce a flux to oppose the flux of the primary windings and serves to maintain the resultant transformer flux substantially constant.

If the frequency of the current supplied to the regulator tends to fall below normal value, then the voltage supplied to the load tends to be reduced in value. The reduction in frequency of the current from the source untunes the temperature frequency compensating circuit so that a lagging current is drawn. The lagging current drawn by the temperature frequency compensating circuit adds to the lagging current drawn through the resistance element 9 to reduce the action of the flux produced by the main compensating circuit in opposing the flux of the primary windings. This action serves to increase the effectiveness of the primary windings so that substantially constant magnetic flux is maintained in the transformer.

In case of temperature changes the capacities of the condensers 6 and 17 in the voltage regulator are varied. An increase in temperature reduces the capacities of the condensers whereas a temperature decrease increases the capacities of the condensers. Whatever change in the ferro-resonance circuit is produced by change in capacity of condenser 6 by temperature changes, an opposite and equal effect on the regulating operation is produced by the temperature changes on the condenser 17. If the temperature decreases and the capacity of the condenser 6 is increased, the output voltage tends to increase. At this time the condenser 17 is so changed as to draw a leading current to offset the lagging current drawn by the main compensating circuit and thus assists the main compensating circuit in producing flux to oppose the flux of the primary windings. This change in the action of the main compensating circuit serves to counteract the change in capacity of the condenser 6 in its effect on the ferro-resonance circuit. An opposite action takes place in case the capacity of the condenser 6 is increased by reason of temperature decrease.

Referring to Fig. 2 of the drawing, a voltage regulator 20 is shown connected between a supply circuit comprising conductors 21 and 22 and a load circuit comprising conductors 23 and 24. The regulator is provided with a ferro-resonance circuit comprising a condenser 25 and two primary windings 26 and 27. The ferro-resonance circuit is connected across the supply conductors 21 and 22. A main compensating circuit comprising a resistance element 28 and a compensating winding 29 is connected across the supply conductors 21 and 22. The primary windings 26 and 27 and the compensating winding 29 are mounted on a core 30. The core 30 is provided with three legs 31, 32 and 33. The primary windings 27, 26 are respectively mounted on the legs 31 and 33 of the core and the compensating winding 29 is mounted on the central leg 32 of the core. A secondary winding 34 which is connected to the load conductors 24 and 23 is mounted on the outside leg 31 of the core. A temperature frequency compensating circuit comprising a condenser 35 shunted across a reactance coil 36 is connected across the compensating winding 29.

The voltage regulator shown in Fig. 2 of the drawing operates in a manner very similar to the voltage regulator shown in Fig. 1 of the drawing. The ferro-resonance circuit comprising the condenser 25 and the primary windings 26 and 27 is operated above the jumping point and the core 30 is operated above the knee of the magnetization curve. The capacity reactance of the condenser 25 in the ferro-resonance circuit is greater at all times than the inductive reactance of the primary windings. The impedance of the ferro-resonance circuit is equal to the capacity reactance of the condenser 25 minus the inductive reactance of the transformer primary windings. Accordingly, the impedance of the ferro-resonance circuit increases as the inductive reactance of the primary windings decreases.

The compensating winding 29 produces a flux flowing through the central leg 32 of the core which opposes the flux in the leg 31 and assists the flux in the leg 33. The fluxes produced by the two primary windings 27 and 26 are in series-aiding relation. The flux produced by the compensating winding 29 in the same direction as the flux produced by the primary winding 26 insures sufficient reactance in the ferro-resonance circuit. The flux circuit of the compensating winding 29, which opposes the flux of the primary winding 27 maintains the flux of the primary winding constant irrespective of supply circuit voltage variations. The main compensating circuit comprising the resistance element 28 and the compensating winding 29 operates in exactly the same manner as the compensating circuit disclosed in Fig. 1 for maintaining the transformer flux substantially constant and a detailed description thereof is deemed unnecessary.

Furthermore, the temperature frequency compensating circuit comprising the condenser 35 and the retardation coil 36 operates in the same manner as the temperature frequency compensating circuit shown in Fig. 1 of the drawing.

Referring to Fig. 3 of the drawing a voltage regulator 40 very similar to the voltage regulator shown in Fig. 2 is connected between a supply circuit comprising conductors 41 and 42 and a load circuit comprising conductors 43 and 44. A ferro-resonance circuit comprising a condenser 45 and a primary winding 46 is connected across the supply conductors 41 and 42. A main compensating circuit comprising a resistance element 47 and two compensating windings 48 and 49 is connected across the supply conductors 41 and 42. The primary winding and the compensating windings are mounted on a three-legged core 50. The three-legged core 50 comprises three legs 51, 52 and 53. The core 50 is operated above the knee of the magnetization coil and the ferro-resonance circuit is operated above the jumping point. The two compensating windings 48 and 49 are respectively mounted on the outside legs 51 and 53 of the core 50. The primary winding 46 of the transformer is mounted on the central leg 52 and the secondary winding 54 of the transformer is mounted on the outside leg 53. The two compensating windings 48 and 49 produce flux in series-aiding relation. The main flux produced by the primary winding 46 is assisted by the flux produced by the compensating winding 48 and opposed by the flux produced by the winding 49.

A temperature frequency compensating circuit comprising a condenser 55 shunted by a retardation coil 56 is connected across the compensating windings 48 and 49. The condenser 45 has a capacitive reactance greater at all times than the inductive reactance of the primary winding 46. The ferro-resonance circuit is operated above the jumping point so that reduced voltage changes are effected across the primary winding for any voltage changes on the source of supply. The total impedance of the ferro-resonance circuit is essentially the difference between the capacitive reactance of condenser 45 and the inductive reactance of the primary winding 46. The inductance of the primary winding 46 decreases with increase in the supply circuit voltage so that if the supply circuit voltage is increased the total impedance of the ferro-resonance circuit increases. On the other hand, the inductance of the primary winding 46 increases with decrease in the supply circuit voltage. Therefore, the current flow through the primary winding 46 does not change at as great a rate as that of the supply circuit voltage. Thus the transformer voltage changes when controlled by the ferro-resonance circuit are much less than the changes in voltage of the supply circuit. The compensating winding 48 which produces a flux in the same direction as the flux produced by the primary winding 46 provides sufficient inductive reactance in the ferro-resonance circuit. The two compensating windings 48 and 49 producing flux in series-aiding relation insure that the voltage transfer between these windings and the primary windings is minimized. The flux produced by the compensating windings is less than the flux produced by the primary winding but varies at a greater rate for any change in voltage on the supply circuit. The main compensating circuit so reduces the transformer output voltage as to maintain this voltage constant irrespective of the supply circuit voltage variations. The temperature frequency compensating circuit comprising the condenser 55 shunted by the retardation coil 56 operates in the same manner as the temperature frequency compensating circuit described with respect to Figs. 1 and 2 of the drawing.

In Figs. 4 and 5 of the drawing are shown vector diagrams illustrating the operation of the voltage regulator in maintaining constant voltage irrespective of load changes. In the vector diagrams shown it is assumed that the supply voltage remains substantially constant. The vector diagrams will be described with reference to the circuit shown in Fig. 1 of the drawing.

The vector $a$ in Fig. 4 represents the flux of the primary coil in the leg 13 of the core 12 and the vector $b$ represents the opposing flux produced by the main compensating circuit. The vector $c$ represents the resultant flux. The phase angle between the main flux and the compensating flux in the leg 13, Fig. 1, depends largely upon the effective resistance in the main or primary circuit. When a light load is on the regulator as indicated in Fig. 4, the vector $b$ is nearly 180 degrees out of phase with the vector $a$. When the load is heavy as indicated by the vector diagram shown in Fig. 5 of the drawing the resistance component of the main or primary circuit is greatly increased and the compensating flux is not nearly so much out of phase with the main flux. In the diagram of Fig. 5 the main flux is represented by the vector $a'$, the compensating flux is represented by the vector $b'$ and the resultant flux is represented by the vector $c'$. The load resistance acts essentially as a shunt across the reactance of the main or primary winding on the leg 13 of Fig. 1. When the load increases the ampere turns producing the main flux are reduced and hence the main flux is reduced. However, on account of the reduced phase angle between the vectors $a'$ and $b'$ there is not so much of the main flux opposed by the compensating flux and the resultant flux $c'$ is essentially the same value as the flux $c$. If so desired the reactances in the main and the compensating circuits could be arranged to effect an increase in load voltage with increase in load.

Modifications in the circuits and in the arrangements and location of parts may be made within the spirit and scope of the invention and such modifications are intended to be covered by the appended claims.

The subject-matter of this application is related to that of my applications Serial No. 354,998 and Serial No. 354,999, filed concurrently herewith.

What is claimed is:

1. In a voltage regulator connected between an alternating current supply circuit and a load circuit, a three-legged core, a transformer having a primary and a secondary winding, at least one compensating winding, said transformer windings and said compensating winding being mounted on at least two legs of said core, a ferro-resonance circuit connected across said supply circuit and comprising a condenser and the primary winding of said transformer, and a compensating circuit comprising a resistance element connected in series with said compensating winding across said supply circuit for producing a flux opposing the flux of said primary winding to maintain constant voltage across said secondary winding irrespective of supply circuit voltage changes and load changes.

2. In a voltage regulator connected between an alternating current supply circuit and a load circuit, a three-legged core, a transformer having at least one primary winding and a secondary winding mounted on said core, two compensating windings respectively mounted on the outside legs of said core, a ferro-resonance circuit connected across said supply circuit and comprising a condenser and the primary winding of said transformer, and a compensating circuit comprising a resistance element connected in series with said compensating winding across the supply circuit for producing a flux opposing the flux of said primary winding to maintain constant voltage across said secondary winding irrespective of supply circuit voltage changes and load changes.

3. In a voltage regulator connected between a supply circuit and a load circuit, a three-legged core, a transformer having two primary windings and a secondary winding, two compensating windings, all of said windings being mounted on the outside legs of said core, a ferro-resonance circuit connected across said supply circuit and comprising a condenser in series with said primary windings, and a compensating circuit connected across said supply circuit and comprising a resistance element in series with said compensating windings.

4. In a voltage regulator connected between a supply circuit and a load circuit, a three-legged core, a transformer having two primary windings and a secondary winding, two compensating windings, all of said windings being mounted on said core, a series ferro-resonance circuit connected across said supply circuit and comprising a condenser and said primary windings, and a compensating circuit connected across said supply circuit and comprising a resistance element and said compensating windings for producing a flux opposing the primary flux to maintain the voltage across the secondary winding constant irrespective of supply circuit voltage changes and load changes.

5. In a voltage regulator connected between an alternating current supply circuit and a load circuit, a three-legged core, a transformer having two primary windings respectively mounted on the outside legs of said core in series-aiding relation and a secondary winding mounted on an outside core leg, two compensating windings respectively mounted on the outside core legs in series opposing relation, a ferro-resonance circuit connected across said supply circuit and comprising a condenser and said primary windings, and a compensating circuit connected across said supply circuit and comprising a resistance element and said compensating windings.

6. In a voltage regulator connected between an alternating current supply circuit and a load circuit, a three-legged core, a transformer having two primary windings respectively mounted on the outside legs of said core in series-aiding relation and a secondary winding mounted on an outside core leg, two compensating windings respectively mounted on the outside core legs in series opposing relation, a ferro-resonance circuit connected across said supply circuit and comprising a condenser and said primary windings, a compensating circuit connected across said supply circuit and comprising a resistance element in series with said compensating windings for producing a flux less than and opposing the primary flux to maintain the voltage across the secondary winding constant irrespective of supply circuit voltage changes and load changes, and a temperature frequency compensating circuit connected across said compensating windings to maintain the secondary voltage constant irrespective of frequency and temperature changes.

7. In a voltage regulator connected between an alternating current supply circuit and a load, a core structure having three legs of magnetic material, a plurality of windings on at least two legs of said core comprising a first winding on one leg of said core, a ferro-resonant circuit the impedance of which is capacitive during normal operation connected across the supply circuit and comprising said first winding and a condenser, said plurality of windings including a second winding in a circuit connected across said supply circuit for producing in said leg a flux opposing the flux produced by said first winding, and an output circuit, one of said plurality of windings being on said leg and in said output circuit.

8. A voltage regulator adapted to be connected to an alternating current supply circuit for controlling the voltage across a load comprising a core structure having three legs of magnetic material, a plurality of windings on said core, a ferro-resonant circuit the impedance of which is capacitive during normal operation connected across the supply circuit and comprising a condenser, a first of said plurality of windings on one of said legs and a second of said plurality of windings on a second leg, said first and second windings producing aiding fluxes in said first leg of said core, a third of said plurality of windings being connected across the supply circuit for producing in said first leg a flux opposing the flux produced by said first and second windings and for producing in said second leg a flux aiding the flux produced by said first and second windings, and an output circuit, one of said plurality of windings being on said first leg and in said output circuit.

9. A voltage regulator adapted to be connected to an alternating current supply circuit for maintaining substantially constant voltage across a load during normal operation comprising a core structure having three legs of magnetic material, a plurality of windings on said core, a ferro-resonant circuit the impedance of which is capacitive during normal operation comprising a condenser and two of said plurality of windings one on each of the outer legs of said core all connected in series across the supply circuit, said two windings producing aiding magnetomotive forces in said core, a circuit comprising a third of said plurality of windings on one of said outer legs and a fourth of said plurality of windings on the other of said outer legs connected across said supply circuit, said third and fourth windings producing substantially equal and opposing magnetomotive forces in said core, and an output circuit, one of said plurality of windings being on an outer leg of said core in which the opposing magnetomotive forces are produced and in said output circuit.

10. A voltage regulator adapted to be connected to an alternating current supply circuit for maintaining substantially constant voltage across a load during normal operation comprising a core structure having three legs of magnetic material, a plurality of windings on said core, a ferro-resonant circuit the impedance of which is capacitive during normal operation connected across said supply circuit and comprising a condenser and a first of said plurality of windings for producing a flux in each of the outer legs of said core, a circuit connected across said supply circuit and including a second of said plurality of windings for producing a flux opposing the flux due to said first winding in one of the outer legs and a flux aiding the flux due to the first winding in the second outer leg, and an output circuit, one of said plurality of windings being on said first outer leg and in said output circuit.

11. A voltage regulator adapted to be connected to an alternating current supply circuit for maintaining substantially constant voltage across a load during normal operation comprising a core structure having three legs of magnetic material, a plurality of windings on said core, a first of said plurality of windings producing a magnetomotive force across one of said legs and a substantially equal magnetomotive force across a second leg, a ferro-resonant circuit the impedance of which is capacitive during normal operation connected across said supply circuit and comprising said first winding and a condenser, a second of said plurality of windings being in a circuit connected across said supply circuit and producing in said first leg a magnetomotive force opposing the magnetomotive force due to said first winding and producing in said second leg a magnetomotive force aiding the magnetomotive force due to said first winding, and an output circuit, one of said plurality of windings being on said first leg and in said output circuit.

12. A voltage regulator adapted to be connected to an alternating current supply circuit for maintaining substantially constant voltage across a load during normal operation comprising a core structure having three legs of magnetic material, a plurality of windings on said core, a ferro-resonant circuit the impedance of which is capacitive during normal operation connected across said supply circuit and comprising a condenser and a first of said plurality of windings on one of the legs of said core for producing a flux in each of the outer legs of said core, a second of said plurality of windings being in a circuit connected across said supply circuit and producing a flux opposing the flux due to said first winding in one of the outer legs and a flux aiding the flux due to the first winding in the second outer leg, and an output circuit, one of said plurality of windings being in said output circuit and on that leg of said core on which is mounted the winding which is in said ferro-resonant circuit.

BRUCE E. STEVENS.